(12) United States Patent
Loof

(10) Patent No.: US 9,562,563 B1
(45) Date of Patent: Feb. 7, 2017

(54) SPHERICAL ROLLER BEARING

(71) Applicant: Marcus Loof, Nol (SE)

(72) Inventor: Marcus Loof, Nol (SE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/079,267

(22) Filed: Mar. 24, 2016

(51) Int. Cl.
*F16C 33/66* (2006.01)
*F16C 19/38* (2006.01)
*F16C 33/48* (2006.01)
*F16C 33/30* (2006.01)

(52) U.S. Cl.
CPC .......... *F16C 19/38* (2013.01); *F16C 33/30* (2013.01); *F16C 33/48* (2013.01); *F16C 2220/00* (2013.01)

(58) Field of Classification Search
CPC ......... F16C 23/086; F16C 19/38; F16C 33/36; F16C 33/48; F16C 33/6681
See application file for complete search history.

(56) References Cited

U.S. PATENT DOCUMENTS

| | | | | | |
|---|---|---|---|---|---|
| 2,740,675 | A | * | 4/1956 | Palmgren | F16C 23/086 384/564 |
| 3,547,504 | A | * | 12/1970 | Lech | F16C 19/38 384/558 |
| 4,199,203 | A | * | 4/1980 | Pearson | F16C 23/086 384/470 |
| 6,152,606 | A | * | 11/2000 | Shirosaki | F16C 23/086 384/475 |
| 6,296,395 | B1 | * | 10/2001 | Brand | F16C 23/086 384/558 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A spherical roller bearing having an axially extending center axis, an outer ring, an inner ring concentric with the outer ring, a guide ring concentric with the inner and outer rings, the guide ring has two lateral surfaces, one set of cambered rollers on either side of the guide ring and a cage structure arranged to retain the two sets of cambered rollers. The guide ring includes two circumferential guide ring sections, an inner guide ring section proximal to the inner ring and an outer guide ring section distal to the inner ring. A portion of at least one of the two lateral surfaces corresponding to the inner guide ring section is provided with at least one of at least one depression and at least one protrusion. The cambered rollers of each set are distanced from the inner guide ring section and in contact with the outer guide ring section.

9 Claims, 3 Drawing Sheets

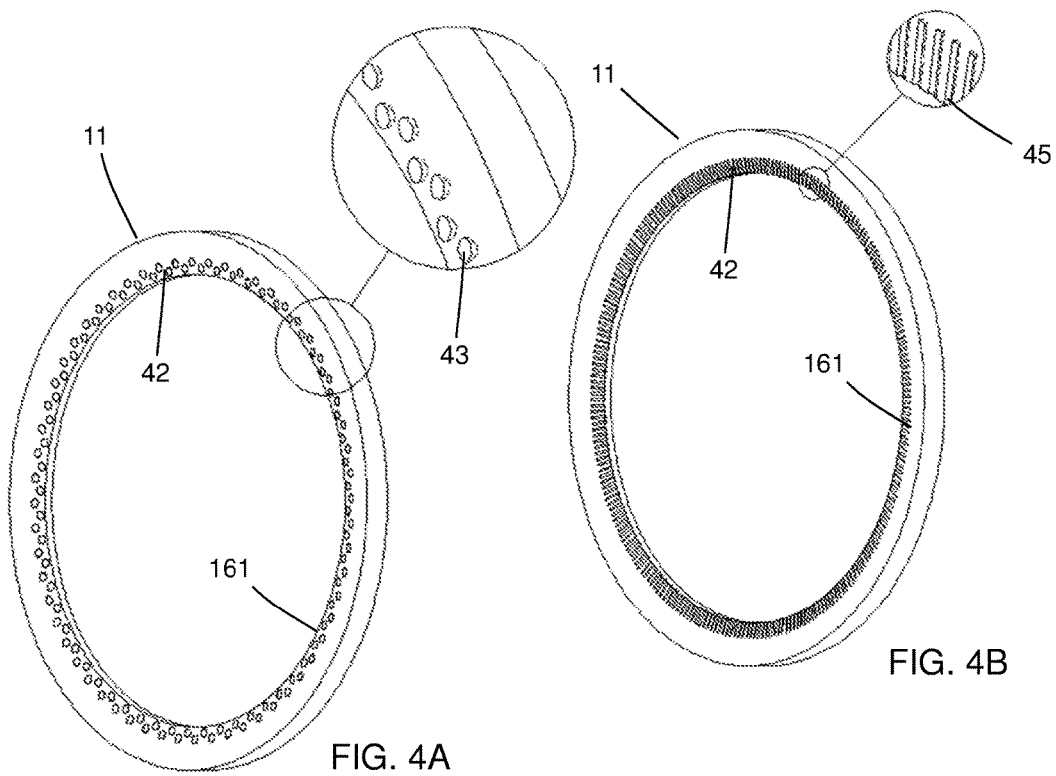
FIG. 4A
FIG. 4B
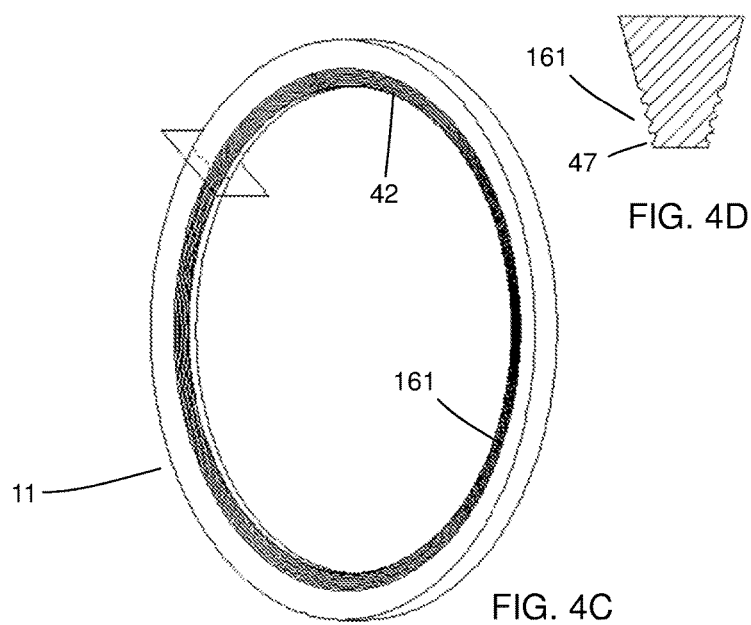
FIG. 4C
FIG. 4D

SPHERICAL ROLLER BEARING

TECHNICAL FIELD

On a general level, the present invention relates to a spherical roller bearing with improved properties.

BACKGROUND OF THE INVENTION

Spherical roller bearings are designed to accommodate heavy radial and axial loads. Structurally, they typically have an outer ring, an inner ring and, between these, there are two rows of oppositely arranged rolling elements that are separated by and interacting with a guide ring, also called centering ring or spacer, so as to optimally distribute the load.

Various tribological components of spherical roller bearings, including the aforementioned, are usually exposed to substantial friction, and, eventually, wear. In order to alleviate consequences of this exposure, lubricants are applied. As each lubricant has finite life that typically is shorter than life of the roller bearing, the lubricant needs to be reapplied periodically. Here, term lubricant life denotes time period in which the lubricant functions reliably. Traditionally, the relubrication is done by packing the exposed bearing with a suitable lubricant, such as grease, either manually or by means of a mechanical packer. This process is fairly complex and time-consuming.

An objective of the present invention is therefore to provide a spherical roller bearing not ridden with drawbacks associated with spherical roller bearings belonging to the prior art.

SUMMARY OF THE INVENTION

The above stated objectives are achieved by means of a spherical roller bearing according to the independent claim.

Accordingly, a spherical roller bearing has an axially extending center axis and provides an outer ring having an outer race, an inner ring arranged concentrically with the outer ring and having two inner races, a guide ring arranged concentrically with the inner ring and the outer ring, wherein the guide ring has an outer base surface facing the outer ring, an inner base surface facing the inner ring and two lateral surfaces extending between the outer base surface and the inner base surface, and wherein the distance in the axial direction between the two lateral surfaces decreases from the outer base surface towards the inner base surface. The spherical roller bearing further provides one set of cambered rollers on either side of the guide ring such that each set of rollers is associated with one inner race, a cage structure arranged to retain the two sets of cambered rollers, wherein the guide ring provides two circumferential guide ring sections, an inner guide ring section being proximal to the inner ring and extending in the radial direction between the inner base surface and a predetermined point arranged between the outer base surface and the inner base surface, an outer guide ring section being distal to the inner ring and extending in the radial direction between the predetermined point and the outer base surface. A portion of at least one of the two lateral surfaces corresponding to the inner guide ring section is provided with at least one depression and/or at least one protrusion wherein the cambered rollers of each set are distanced from the inner guide ring section and in contact with the outer guide ring section.

In the following, positive effects and advantages of the invention at hand are presented.

The present invention is based on the insight that the rollers of an operating spherical roller bearing behave in a rather particular manner. More specifically, for a guide ring of the above-described type the roller end will not contact the entire lateral surface of the guide ring it faces. Rather, the rollers are distanced from the inner guide ring section and in contact with the outer guide ring section. This applies to a roller in initial position, when the entire bearing is at rest, as well as for the roller that, in consequence of the roller being set in motion, deviates from the initial position, i.e. either a positive or a negative roller skew is present. Now and rather counterintuitively, if the roller skew is present in a guide ring of the above-described type, the contact surface between a skewed roller and the lateral surface of the guide ring will always move radially outwards, i.e. towards the outer ring, as compared with the contact surface of the roller in its initial position. This is true regardless of the direction of the roller skew. Accordingly, the inner ring has the proximal, inner guide ring section that isn't brought in contact with the roller. By providing the portion of at least one of the two lateral surfaces corresponding to the inner guide ring section with at least one depression and/or at least one protrusion, the actual surface is rendered uneven and is, as such, suitable for retaining the applied lubricant. Effectively, the portion of at least one of the two lateral surfaces constitutes a lubricant reservoir. The stored lubricant, typically grease, then gradually diffuses out of the reservoir and lubricates various parts of the roller bearing. Accordingly, relubrication of the bearing may be performed without dismantling the assembly in order to expose the bearing for subsequent packing. This saves time and significantly simplifies the relubrication process.

The lubricant reservoir of the above-described type, in particular its placement, also facilitates introduction of the lubricant between the distal, outer guide ring section and the roller. Here, by adequately lubricating this contact surface, the wear on the guide ring is substantially reduced.

Different embodiments of the invention are disclosed in the dependent claims and in the detailed description.

BRIEF DESCRIPTION OF THE DRAWINGS

FIGS. 4A-4C are perspective views of a guide ring being part of the spherical roller bearing according to one embodiment of the present invention. In particular, different ways to realize depressions on a relevant portion of the lateral surface are shown. FIG. 4D is an axial cross-sectional view of the guide ring of FIG. 4C.

Further advantages and features of embodiments will become apparent when reading the following detailed description in conjunction with the drawings.

DETAILED DESCRIPTION OF THE INVENTION

The present invention will now be described more fully hereinafter with reference to the accompanying drawings, in which preferred embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
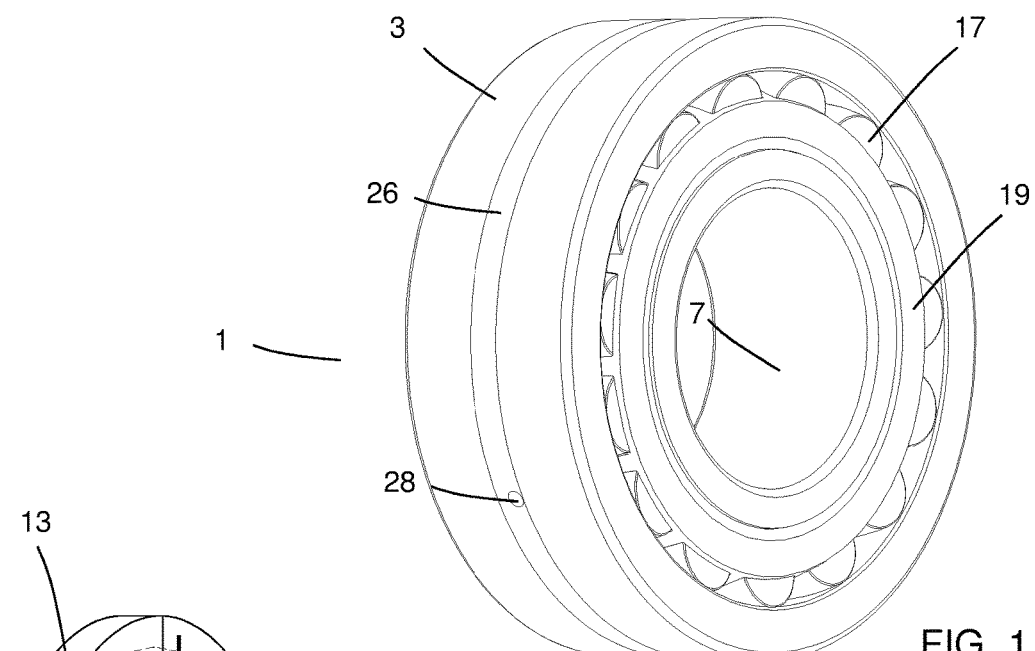
FIG. 1 is a perspective side view of a spherical roller bearing according to one embodiment of the present invention.

FIG. 1 is a perspective side view of a spherical roller bearing 1 according to one embodiment of the present invention. Owing to their reliability, the spherical roller bearings have found wide industrial use. They are most suitable for applications characterized by heavy loads and moderate speeds, such as wind turbines, pulp and paper processing equipment and gear boxes.

As it may be seen, the shown spherical roller bearing 1 is substantially cylindrically shaped. An outer ring 3, a full set of cambered rollers 17, a cage structure 19 that retains the shown set of cambered rollers 17 and an inner ring 7 arranged concentrically with the outer ring 3 are visible in FIG. 1. A lubrication groove 26 and a lubrication inlet 28 may also be seen. These and other components of the spherical roller bearing 1, in particular those not visible in FIG. 1, will be shown and discussed in greater detail in connection with other Figs.

Figure 2A:
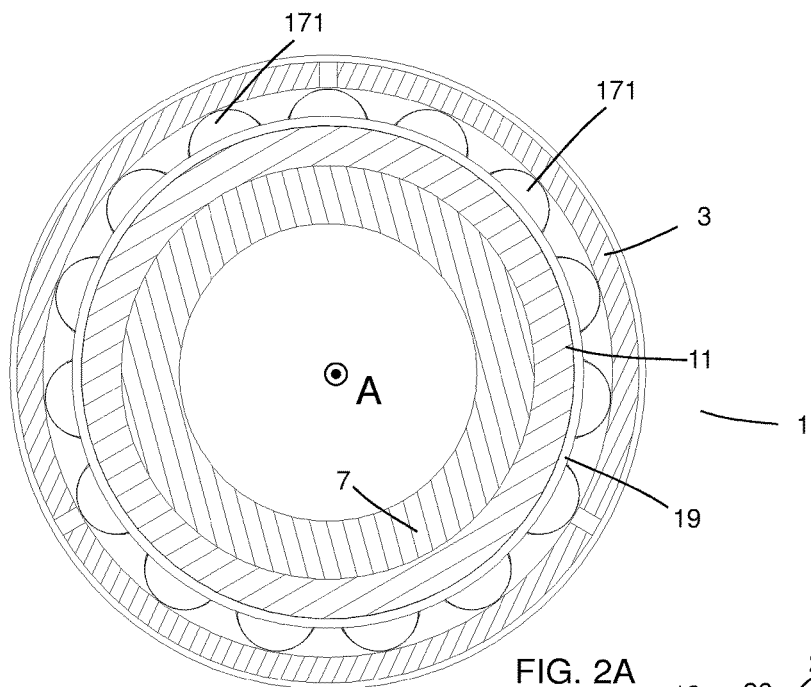
FIG. 2A is a radial cross-sectional view of a spherical roller bearing according to one embodiment of the present invention.

FIG. 2A is a radial cross-sectional view of a spherical roller bearing 1 according to one embodiment of the present invention. Here, the spherical roller bearing 1 has an axially extending center axis (A) that is perpendicular to the plane of the paper. As stated in connection with FIG. 1, the spherical roller bearing 1 provides an outer ring 3, an inner ring 7 arranged concentrically with the outer ring 3, a guide ring 11 arranged between the inner ring 7 and the outer ring 3 and being concentrical with these. The bearing 1 further provides one set of cambered rollers on either side of the guide ring (only one of these sets 171 being visible in FIG. 2A) and a cage structure 19 arranged to retain the cambered rollers 171.

Figure 2B:
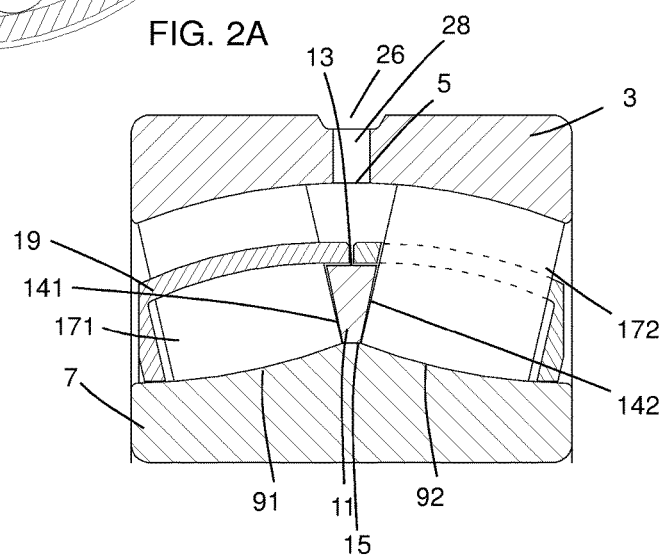
FIG. 2B is an axial cross-sectional view of the spherical roller bearing of FIG. 2A.

FIG. 2B is an axial cross-sectional view of the spherical roller bearing 1 of FIG. 2A. In addition to what has been disclosed in connection with FIG. 2A, the outer ring 3 provides an outer race 5 that faces the inner ring 7. The inner ring 7 provides two inner races 91, 92 facing the outer race 5. Furthermore, a guide ring 11, that circumferentially abuts the inner ring 7, has an outer base surface 13 facing the outer ring 3, an inner base surface 15 facing the inner ring 7 and two lateral surfaces 141, 142 extending between the outer base surface 13 and the inner base surface 15, wherein the distance in the axial direction between the two lateral surfaces 141, 142 decreases from the outer base surface 15 towards the inner base surface 13. One set of cambered rollers 171, 172 is on either side of the guide ring 11 such that each set of rollers is associated with one inner race 91, 92. The rollers 171, 172 are in their initial position, hence inclined at an angle with respect to the center axis (A). The rollers 171, 172 may skew away from their initial position in order to accommodate the imposed load. A cage structure 19 is arranged to retain rollers 171, 172. Previously mentioned lubrication groove 26 and lubrication inlet 28 may also be seen. Further, the guide ring 11 circumferentially abuts the inner ring 7.

Figure 3:
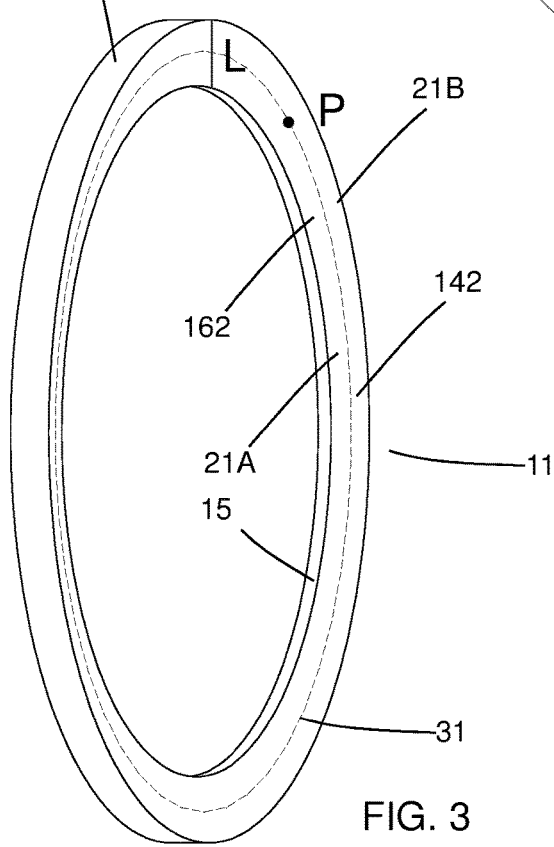
FIG. 3 is a perspective view of a guide ring with a circumferential line provided on a lateral surface of the guide ring.

FIG. 3 is a perspective view of a guide ring 11 with a continuously tapering radial cross-section and having a circumferential line 31 provided on a lateral surface 142 of the guide ring 11. This circumferential line 31 separates two circumferential guide ring sections 21A, 21B of the guide ring 11. More specifically, the guide ring 11 provides an inner guide ring section 21A being proximal to the inner ring (not shown in FIG. 3) and extending in the radial direction between the inner base surface 15 and a predetermined point P arranged between the outer base surface 13 and the inner base surface 15. In FIG. 3, the predetermined point P is arranged on the circumferential line 31. In one embodiment, the predetermined point P is arranged at the midpoint between the outer base surface 13 and the inner base surface 15 of the guide ring 11. In another embodiment, where L is the total distance between the inner base surface 13 and the outer base surface 15 of the guide ring 11, the predetermined point P is located at a position equal to or more than 0.4 L from the inner base surface and equal to or less than 0.6 L from the inner base surface. Generally, the size of the interval containing the predetermined point P may vary greatly as a function of the intended field of application. The guide ring 11 further provides an outer guide ring section 21B being distal to the inner ring and extending in the radial direction between the predetermined point P and the outer base surface 15. Once the spherical roller bearing is fully assembled and the rollers (not shown in FIG. 3) are in their initial position, the rollers are distanced from the inner guide ring section 21A and in contact with the outer guide ring section 21B, the contact zone being delimited by the circumferential line 31. As argued above, if the roller skew is present, the contact surface between a skewed roller and the lateral surface of the guide ring 142 will always move radially outwards, i.e. towards the outer base surface 13, as compared with the contact surface of the roller in its initial position. This is true regardless of the direction of the roller skew.

The invention at hand leverages the above insight. In particular, at least one depression and/or at least one protrusion (not shown in FIG. 3, but thoroughly discussed in conjunction with FIGS. 4A-4D) may be provided in the portion 162 of at least one of the two lateral surfaces 142 (lateral surface 141 is not visible in FIG. 3) corresponding to the inner guide ring section 21A. Due to its uneven surface, the portion 162 then effectively becomes a lubricant reservoir. The stored lubricant, typically grease, may gradually diffuse out of the reservoir in order to lubricate parts of the roller bearing. A simple and time-efficient relubrication process is hereby achieved. In order to further improve the lubricant-retaining effect, the portion 162 could also have a textured surface in order to attract the lubricant.

Here, presence of the lubricant reservoir according to the above may dispense with use of lubrication groove and lubrication inlet (discussed in connection with FIGS. 1 and 2).

The lubricant reservoir of the above-described type, in particular its placement, also facilitates introduction of the lubricant between the distal, outer guide ring section 21B and the roller (not shown in FIG. 3). Here, by adequately lubricating this contact surface, the wear on the guide ring 11 is substantially reduced.

FIGS. 4A-4C are perspective views of a guide ring 11 being part of the spherical roller bearing according to one embodiment of the present invention whereas FIG. 4D is an axial cross-sectional view of the guide ring of FIG. 4C.

As it may be seen, the depressions 42 may be realized in different ways. Thus, FIG. 4A shows a guide ring 11 where a portion 161 (portion 162 is not visible in FIGS. 4A-4C) is provided with a circumferentially extending array of depressions 43 having a hemispherical shape. Depressions 43 may be clearly seen in the magnified image of a segment of the guide ring 11. In a closely related embodiment (not shown), a portion 161 could be provided with a circumferentially extending array of protrusions having a hemispherical shape. It is also conceivable to combine hemisphericallyshaped depressions and protrusions on a single guide ring. Any of the above-described embodiments would be particularly suitable for cost-effective manufacturing of sintered guide rings. In a further embodiment (not shown), the portion could be provided with an array of circumferentially extending blind bores. A guide ring 11 shown in FIG. 4B has a portion 162 provided with a plurality of radially extending knurls 45. The knurls 45 may be clearly seen in the magnified image of a segment of the guide ring 11. The guide ring of this type may be manufactured using sintering. Alternatively, the knurls 45 may be made in post operation, e.g. using pressing/stamping or milling. FIG. 4C shows a guide ring 11 where a portion 161 is provided with a number of closed-loop grooves 47. These are clearly visible in FIG. 4D that is an axial cross-sectional view of the guide ring 11 of FIG. 4C. Advantageously, the guide ring containing such grooves may be manufactured by means of sintering or turning. In a closely related embodiment (not shown), the portion 161 may be provided with an open-loop groove, i.e. the groove has a spiral shape.

On the general level, all shown guide ring designs may be manufactured using standard production processes, such as sintering, turning, pressing or milling. In particular, sintering offers numerous benefits, e.g. a simple process since the depressions/protrusions are made in the same working moment as the ring itself, material savings. Here, it is equally conceivable to arrange more than one type of the above-discussed depressions/protrusions in the relevant portion of at least one of the two lateral surfaces.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A spherical roller bearing having an axially extending center axis (A) and comprising:
   an outer ring having an outer race,
   an inner ring concentric with the outer ring and having two inner races,
   a guide ring concentric with the inner ring and the outer ring, wherein the guide ring has an outer base surface facing the outer ring, an inner base surface facing the inner ring and two lateral surfaces extending between the outer base surface and the inner base surface, wherein the distance in the axial direction between the two lateral surfaces decreases from the outer base surface towards the inner base surface,
   one set of cambered rollers on either side of the guide ring such that each set of rollers is associated with one inner race,
   a cage structure arranged to retain the two sets of cambered rollers, wherein the guide ring provides two circumferential guide ring sections, an inner guide ring section proximal to the inner ring and extending in the radial direction between the inner base surface and a predetermined point (P) arranged between the outer base surface and the inner base surface, an outer guide ring section being distal to the inner ring and extending in the radial direction between the predetermined point (P) and the outer base surface, wherein a portion of at least one of the two lateral surfaces corresponding to the inner guide ring section is provided with at least one of at least one depression and at least one protrusion and wherein the cambered rollers of each set are distanced from the inner guide ring section and in contact with the outer guide ring section.

2. The spherical roller bearing according to claim 1, wherein the portion has a textured surface.

3. The spherical roller bearing according to claim 1, wherein the at least one depression has a hemispherical shape.

4. The spherical roller bearing according to claim 1, wherein the at least one depression is a blind bore.

5. The spherical roller bearing according to claim 1, wherein the at least one depression is a closed-loop groove.

6. The spherical roller bearing according to claim 1, wherein the at least one depression is a radially extending knurl.

7. The spherical roller bearing according to claim 1, wherein the at least one protrusion has a semi-spherical shape.

8. The spherical roller bearing according to claim 1, wherein the guide ring is manufactured using at least one of sintering, pressing, milling and turning.

9. The spherical roller bearing according to claim 1, wherein the guide ring circumferentially abuts the inner ring.

* * * * *